(12) United States Patent
Nunes

(10) Patent No.: US 9,819,840 B2
(45) Date of Patent: Nov. 14, 2017

(54) AUDIO DEVICE THAT EXTRACTS THE AUDIO OF A MULTIMEDIA STREAM AND SERVES THE AUDIO ON A NETWORK WHILE THE VIDEO IS DISPLAYED

(71) Applicant: Bryan Nunes, Sunnyvale, CA (US)

(72) Inventor: Bryan Nunes, Sunnyvale, CA (US)

( * ) Notice: Subject to any disclaimer, the term of this patent is extended or adjusted under 35 U.S.C. 154(b) by 0 days.

(21) Appl. No.: 14/016,148

(22) Filed: Sep. 2, 2013

(65) Prior Publication Data

US 2014/0002738 A1  Jan. 2, 2014

Related U.S. Application Data

(63) Continuation-in-part of application No. 13/004,847, filed on Jan. 11, 2011.

(60) Provisional application No. 61/294,085, filed on Jan. 11, 2010.

(51) Int. Cl.
| | |
|---|---|
| *H04N 5/08* | (2006.01) |
| *H04H 20/61* | (2008.01) |
| *H04N 21/41* | (2011.01) |
| *H04N 21/414* | (2011.01) |
| *H04N 21/43* | (2011.01) |
| *H04N 21/4363* | (2011.01) |
| *H04N 21/643* | (2011.01) |
| *H04N 21/81* | (2011.01) |

(52) U.S. Cl.
CPC ............ *H04N 5/08* (2013.01); *H04H 20/61* (2013.01); *H04N 21/4126* (2013.01); *H04N 21/41415* (2013.01); *H04N 21/4307* (2013.01); *H04N 21/43637* (2013.01); *H04N 21/64322* (2013.01); *H04N 21/8106* (2013.01)

(58) Field of Classification Search
CPC ..... H04L 47/10; H04L 47/15; H04L 47/2441; H04L 12/5602; H04L 12/5693; H04Q 11/0478
USPC ....... 710/306; 348/500; 375/240.2; 709/223, 709/231; 386/223, 46; 370/325, 356
See application file for complete search history.

(56) References Cited

U.S. PATENT DOCUMENTS

| | | | | |
|---|---|---|---|---|
| 5,418,577 | A * | 5/1995 | Bagley | H04H 20/02 348/729 |
| 5,668,601 | A * | 9/1997 | Okada | H04N 21/4307 370/503 |
| 7,606,215 | B2 * | 10/2009 | Poniatowski | G09F 27/00 370/352 |
| 7,609,173 | B2 * | 10/2009 | Vanderwall et al. | 340/901 |
| 8,243,924 | B2 | 8/2012 | Chen et al. | |
| 8,505,054 | B1 * | 8/2013 | Kirley | H04N 21/4307 725/74 |
| 2003/0198256 | A1 * | 10/2003 | Wang | H04N 5/04 370/503 |
| 2004/0071088 | A1 | 4/2004 | Curcio et al. | |
| 2004/0123103 | A1 | 6/2004 | Risan et al. | |

(Continued)

*Primary Examiner* — Andrew Lai
*Assistant Examiner* — Jamaal Henson
(74) *Attorney, Agent, or Firm* — David Crites

(57) ABSTRACT

A device, system, and method may provide an audio component of a multimedia stream playing on a video monitor to one or more wireless computing devices. The extracted audio component of the multimedia content may be packetized into data packets and broadcast via a network such that the data packets can be received by the wireless computing devices and the audio component can be played by the wireless computing devices in synchronization with the visual component playing on the video monitor.

21 Claims, 2 Drawing Sheets

(56) References Cited

U.S. PATENT DOCUMENTS

| | | | |
|---|---|---|---|
| 2004/0216171 A1* | 10/2004 | Barone, Jr. | H04H 20/14 725/135 |
| 2004/0220862 A1* | 11/2004 | Jackson | G06F 3/002 705/26.1 |
| 2005/0019020 A1* | 1/2005 | Sato | H04N 7/52 386/201 |
| 2005/0094557 A1* | 5/2005 | Chen | H04L 12/1868 370/229 |
| 2005/0124414 A1* | 6/2005 | Hussaini | A63F 13/02 463/35 |
| 2006/0037040 A1* | 2/2006 | Mahalick | H04H 20/20 725/32 |
| 2006/0075439 A1* | 4/2006 | Vance | H04L 29/06027 725/81 |
| 2006/0104600 A1* | 5/2006 | Abrams | H04N 5/247 386/223 |
| 2006/0233163 A1* | 10/2006 | Celi, Jr. | H04L 29/06027 370/356 |
| 2006/0236354 A1* | 10/2006 | Sutardja | H04H 20/08 725/100 |
| 2008/0167738 A1* | 7/2008 | Lee | G11B 20/00731 700/94 |
| 2008/0183853 A1 | 7/2008 | Manion et al. | |
| 2008/0209066 A1 | 8/2008 | Spio et al. | |
| 2008/0246835 A1* | 10/2008 | Tian | H04N 7/14 348/14.12 |
| 2009/0007193 A1 | 1/2009 | Correa et al. | |
| 2009/0091655 A1* | 4/2009 | Russell | H04N 21/2368 348/515 |
| 2009/0300241 A1 | 12/2009 | Young et al. | |
| 2011/0047583 A1* | 2/2011 | Howard et al. | 725/109 |

* cited by examiner

AUDIO DEVICE THAT EXTRACTS THE AUDIO OF A MULTIMEDIA STREAM AND SERVES THE AUDIO ON A NETWORK WHILE THE VIDEO IS DISPLAYED

CROSS REFERENCE TO RELATED APPLICATIONS

This application is a continuation-in-part of U.S. patent application Ser. No. 13/004,847 titled "SYSTEM AND METHOD FOR PROVIDING AN AUDIO COMPONENT OF A MULTIMEDIA CONTENT DISPLAYED ON AN ELECTRONIC DISPLAY DEVICE TO ONE OR MORE WIRELESS COMPUTING DEVICES" filed on Jan. 11, 2011; which is entitled to the benefit of U.S. Provisional Patent Application Ser. No. 61/294,085, filed on Jan. 11, 2010. The methods of U.S. patent application Ser. No. 13/004,847 titled "SYSTEM AND METHOD FOR PROVIDING AN AUDIO COMPONENT OF A MULTIMEDIA CONTENT DISPLAYED ON AN ELECTRONIC DISPLAY DEVICE TO ONE OR MORE WIRELESS COMPUTING DEVICES" filed on Jan. 11, 2011 are herein incorporated by reference.

FIELD OF TECHNOLOGY

This disclosure relates generally to wireless communication and specifically to the wireless delivery of audio.

BACKGROUND

When a video monitor is visible to many viewers, using loudspeakers to broadcast the accompanying audio may be problematic. Noise from the surrounding environment may interfere with the audio, different individuals may be viewing different video monitors, individuals who are not watching the video may not wish to hear the audio, different individuals may prefer the audio in different languages or sound levels, and a video provider may be unable to gauge viewership. Thus there is a need for methods, devices, and systems that transmit audio to wireless electronic devices such that the audio may be played in sync with the video playing on a video monitor. There is particular need for such methods, devices, and systems that do not insert unwanted delay by buffering the video signal in order to accommodate the audio multicasting.

SUMMARY

Disclosed are a method, system, and device for providing an audio component of a multimedia stream to one or more wireless computing devices. In an example embodiment, an audio device extracts the audio component of the multimedia stream as the visual component is played on a video monitor. In one embodiment, the audio is packetized into data packets and transmitted via a network such that the data packets can be received by a wireless computing device and the audio component can be played by the wireless computing device in synchronization with the visual component playing on the video monitor.

In one aspect, the audio device comprises an audio input, a network interface, a processor with memory, and a synchronization player application configured to extract the audio component from the audio input, packetize the audio component into data packets, and transmit the data packets via the network interface such that the data packets can be received by the wireless computing device and the audio component can be played by the wireless computing device in synchronization with the visual component playing on the video monitor. In one embodiment, the audio device does not output the visual component and thus the audio device may not buffer the visual component.

The methods, system, and/or apparatuses disclosed herein may be implemented in any means for achieving various aspects, and may be executed in a form of machine readable non-transient storage medium embodying a set of instruction that, when executed by a machine, causes the machine to perform any of the operations disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, system, and device for providing an audio component of a multimedia stream to one or more wireless computing devices. Although the present embodiments have been described with reference to specific example embodiments, it will be evident that various modifications and changes may be made to these embodiments without departing from the broader spirit and scope of the various embodiments.

In one embodiment, an electronic display device may output the visual component of a multimedia stream and also provide the audio component of the multimedia stream to a wireless computing device. In this embodiment, providing the audio component to a wireless device may comprise extracting the audio component, packetizing the audio component, and transmitting the audio component via a network. In this embodiment the electronic display device may delay output of the visual component to accommodate extracting, packetizing, and transmitting the audio component.

Figure 1:
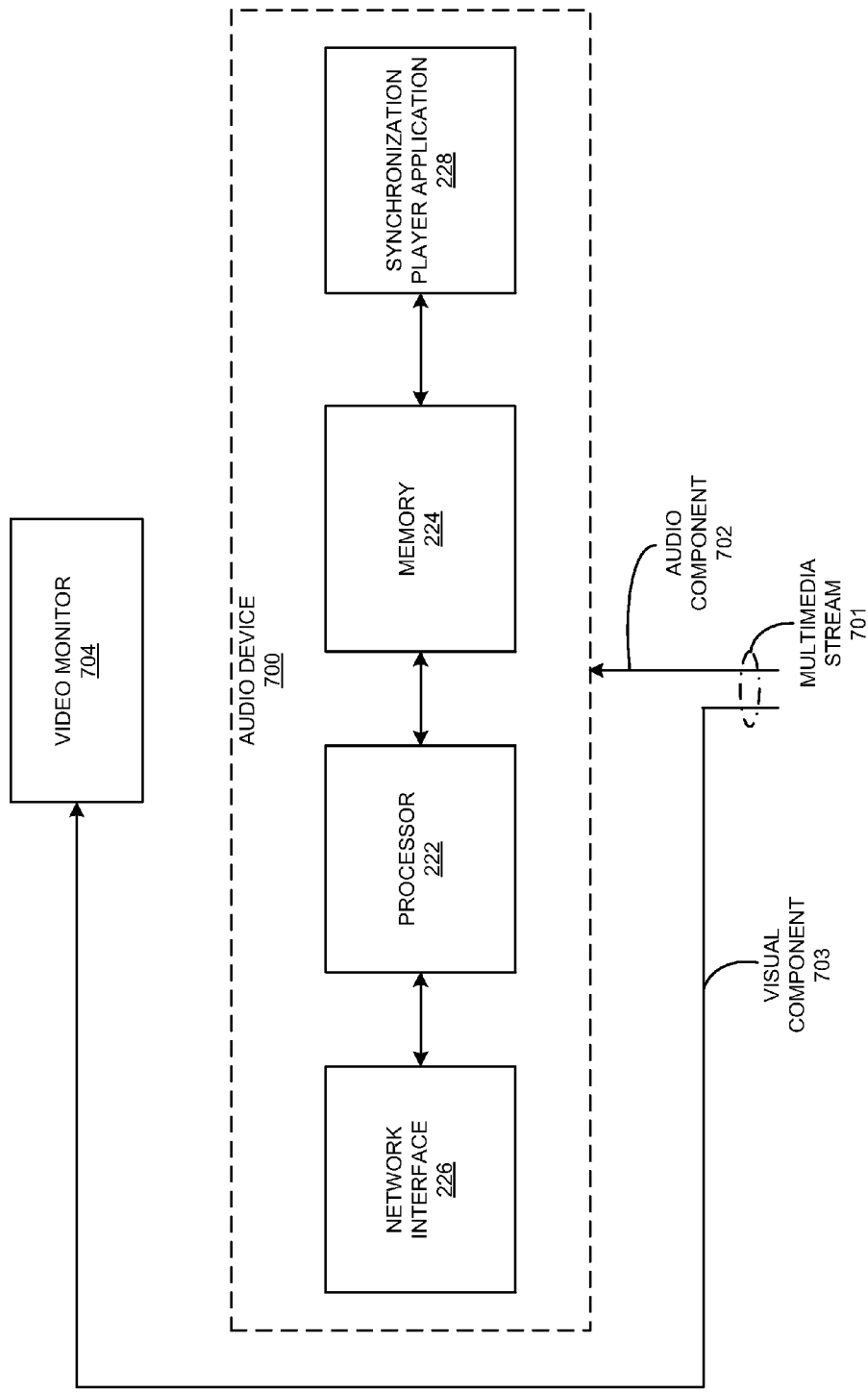
FIG. 1 is a block diagram of the audio device and the video monitor, according to one embodiment.
Figure 2:
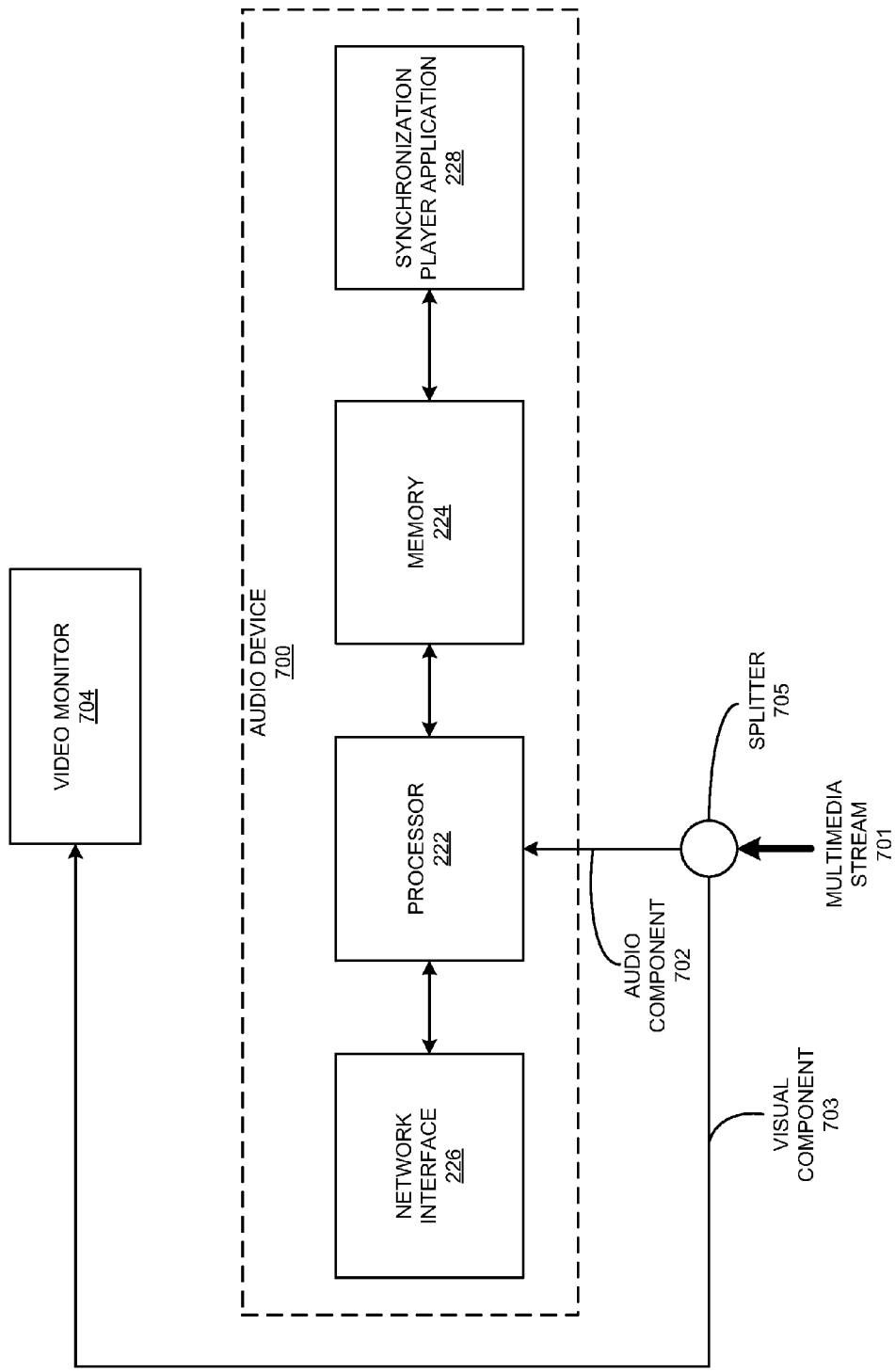
FIG. 2 is a block diagram of the audio device and the video monitor, according to another embodiment.

In other embodiments, any multimedia source common in the art may output the multimedia stream to a video monitor common in the art and an audio device may extract, packetize, and transmit the audio component of the multimedia stream without affecting the visual component of the multimedia stream. "Without affecting" may mean without outputting the visual component but may allow simple insertion loss. In these embodiments, the enclosure of the audio device may comprise one or more multimedia connectors or video connectors, yet the audio device may not output the visual component of the multimedia stream. In the example of FIG. 1, the audio component 702 of the multimedia stream 701 may be carried by one or more audio cables that may be separate or easily separated from the video cable(s) carrying the visual component 703. As in FIG. 1, the audio device 700 enclosure may simply have no connector for video output. In the example of FIG. 2, the multimedia stream 701 may be carried by a multimedia cable that carries both the visual component 703 and the audio component 702. As in FIG. 2, a cable splitter or signal splitter 705 may separate the multimedia stream 701 into a visual component 703 and an audio component 702 such that the audio device 700 may not output the visual component 703 of the multimedia stream 701. As in FIG. 2, the splitter 705 may be outside or inside an enclosure of the audio device. As in FIG. 2, when the splitter 705 is inside the audio device 700 enclosure the visual component 703 of the multimedia stream 701 may passthrough the audio device 700 enclosure but the audio device 700 may not output the visual component 703 of the multimedia stream 701. As in FIG. 2, when the splitter 705 is inside the audio device 700 enclosure, the enclosure may comprise one or more video cables or video connectors, yet the audio device 700 may not output the visual component 703 of the multimedia stream 701. In yet another example, the audio device 700 may monitor the video and so may comprise one or more video inputs yet may not output the visual component 703 of the multimedia stream 701. In a further example, the audio device 700 may not comprise an enclosure or may be incorporated into another audio/video equipment enclosure, and yet may not output the visual component 703 of the multimedia stream 701.

In an example embodiment, the audio device 700 enclosure may comprise a High-Definition Multimedia Interface (HDMI). In one embodiment, the audio device 700 enclosure may comprise a Unified Display Interface (UDI). In one embodiment, the audio device 700 enclosure may comprise a DisplayPort interface. In one embodiment, the audio device 700 enclosure may comprise a Sony/Philips Digital Interconnect Format (S/P DIF) interface. In one embodiment, the audio device 700 enclosure may comprise an analog interface (e.g. RCA Connector, BNC Connector).

In one aspect, the audio device 700 may comprise a processor 222 and memory 224, an audio input, a network interface 226, and a synchronization player application 228 that may extract the audio component from the audio input, packetize the audio component into data packets, and transmit the data packets via the network interface such that the data packets can be received by the wireless computing device and the audio component can be played by the wireless computing device in synchronization with the visual component playing on a video monitor. In one aspect, the synchronization player application 228 may not output the visual component 703 of the multimedia stream 701. In one aspect, the synchronization player application may not display the visual component 703 of the multimedia stream 701 on a display. In one aspect, the processor 222 and memory 224 may not output the visual component 703 of the multimedia stream 701.

In one aspect, a method provides an audio component 702 of a multimedia stream 701 to a wireless computing device, wherein the multimedia stream 701 comprises a visual component 703 playing on a video monitor 704. In one aspect, the multimedia stream may comprise an analog signal. In one aspect, the multimedia stream may comprise a digital signal.

In one aspect, an audio device may extract the audio component of the multimedia stream from an audio input of the audio device. In one aspect, the audio device may extract the audio component of the multimedia stream by capturing the audio component of the multimedia stream from an audio connector. In one aspect, the audio device may extract the audio component of the multimedia stream by capturing the audio component of the multimedia stream from a multimedia connector. In one aspect, the audio device may extract the audio component of the multimedia stream by capturing the audio component of the multimedia stream from an audio input of the audio device, wherein the audio input is not from a connector (e.g. a wired input, PCB input, soldered input, or other input).

In one aspect, the audio device may packetize the audio component into data packets. In one aspect, the audio device may packetize the audio component into Internet Protocol (IP) packets, wherein IP comprises the internet protocol suite and extensions.

In one aspect, the audio device may transmit the data packets via the network interface such that the data packets can be received by the wireless computing device and the audio component can be played by the wireless computing device in synchronization with the visual component playing on the video monitor. In one aspect, the audio device may transmit the data packets using Real-time Transport Protocol (RTP). In one aspect, the audio device may transmit the data packets using streaming based on Hypertext Transfer Protocol (HTTP) or another streaming protocol. In one aspect, "synchronization" may mean the audio and video are played with relative timing that is sufficient for human consumption.

In one aspect, a connection may be established between the wireless computing device and the audio device via the network. In one aspect, a user of a wireless computing device may initiate a connection between the wireless computing device and the audio device via the network. In one aspect, the audio device may create a log of interactions between the wireless computing device and the audio device. In one aspect, the log may comprise listenership statistics, GPS data, information about the wireless computing device and its software, and other information the device may share or the user may share.

In addition, it will be appreciated that the various operations, processes, and methods disclosed herein may be embodied in a non-transitory machine-readable medium and/or a machine accessible medium compatible with a data processing system, and may be performed in any order (e.g., including using means for achieving the various operations). Accordingly, the specification and drawings are to be regarded in an illustrative rather than a restrictive sense.

What is claimed is:

1. A method for providing an audio component of a multimedia stream to a wireless computing device, wherein the multimedia stream comprises a visual component playing on a video monitor, the method comprising:
   extracting, by an audio device, the audio component of the multimedia stream;
   packetizing, by an audio device, the audio component into data packets for transmission; and
   transmitting, by an audio device, the data packets via a network such that the data packets can be received by the wireless computing device and the audio component can be played by the wireless computing device in synchronization with the visual component playing on the video monitor, wherein the audio device is configured to pass the visual component to the video monitor without affecting the visual component, wherein the wireless computing device comprises a display, and the multimedia stream is output by a multimedia source.

2. The method of claim 1 wherein the data packets comprise Internet Protocol (IP) packets.

3. The method of claim 1 wherein transmitting the data packets comprises transmitting the data packets using Real-time Transport Protocol (RTP).

4. The method of claim 1 wherein extracting comprises capturing the audio component of the multimedia stream from an audio connector.

5. The method of claim 1 wherein the visual component of the multimedia stream is passed-through to the video monitor without modification.

6. The method of claim 1 further comprising: establishing a connection between the wireless computing device and the audio device via the network.

7. The method of claim 6 further comprising: creating a log of interactions between the wireless computing device and the audio device.

8. An audio device configured to provide an audio component of a multimedia stream to a wireless computing device, wherein the multimedia stream comprises a visual component playing on a video monitor, the audio device comprising:
a network interface;
an audio input; and
a processor configured to extract the audio component from the audio input, packetize the audio component into data packets, and transmit the data packets via the network interface such that the data packets can be received by the wireless computing device and the audio component can be played by the wireless computing device in synchronization with the visual component playing on the video monitor, wherein the audio device is configured to pass the visual component to the video monitor without affecting the visual component, wherein the wireless computing device comprises a display, and the multimedia stream is output by a multimedia source.

9. The device of claim 8 wherein the data packets comprise Internet Protocol (IP) packets.

10. The device of claim 8 wherein the processor is configured to transmit the data packets using Real-time Transport Protocol (RTP).

11. The device of claim 8 wherein the audio input is from an audio connector.

12. The device of claim 8 that passes the visual component of the multimedia stream through to the video monitor without modification.

13. The device of claim 8 wherein the processor is further configured to establish a connection to the wireless computing device via the network interface.

14. The device of claim 13 wherein the processor is configured to create a log of interactions between the wireless computing device and the audio device.

15. A synchronization system that provides an audio component of a multimedia stream to a wireless computing device, wherein the multimedia stream comprises a visual component playing on a video monitor, the system comprising:
the multimedia stream;
a network interface;
an audio input; and
a processor configured to extract the audio component from the multimedia stream, packetize the audio component into data packets, and transmit the data packets via the network interface such that the data packets can be received by the wireless computing device and the audio component can be played by the wireless computing device in synchronization with the visual component playing on the video monitor, wherein the system is configured to pass the visual component to the video monitor without affecting the visual component, wherein the wireless computing device comprises a display, and the multimedia stream is output by a multimedia source.

16. The system of claim 15 wherein the data packets comprise Internet Protocol (IP) packets.

17. The system of claim 15 wherein the processor is configured to transmit the data packets using Real-time Transport Protocol (RTP).

18. The system of claim 15 wherein the audio input is from an audio connector.

19. The system of claim 15 that passes the visual component of the multimedia stream through to the video monitor without modification.

20. The system of claim 15 wherein the processor is further configured to establish a connection to the wireless computing device via the network interface.

21. The system of claim 20 wherein the processor is configured to create a log of interactions between the wireless computing device and the system.

* * * * *